United States Patent [19]

Fromme et al.

[11] 4,013,015
[45] Mar. 22, 1977

[54] COUPLING AND BRAKING DEVICE FOR TOW PIN DRIVEN FLOOR TRUCKS

[75] Inventors: Hans-Georg Fromme, Stuttgart; Günter Böttner, Wolfschlugen, both of Germany

[73] Assignee: Thyssen Aufzuege GmbH., Stuttgart, Germany

[22] Filed: Aug. 25, 1975

[21] Appl. No.: 607,554

[30] Foreign Application Priority Data

Aug. 24, 1974 Germany .................. 2440681

[52] U.S. Cl. .................................. 104/172 BT
[51] Int. Cl.² .................................. B61B 13/00
[58] Field of Search ............. 293/3, 8, 69; 180/92; 104/172 B, 172 BT

[56] References Cited

UNITED STATES PATENTS

| | | | |
|---|---|---|---|
| 3,415,200 | 12/1968 | Bishop et al. | 104/172 BT |
| 3,503,338 | 3/1970 | Klamp | 104/172 BT |
| 3,675,587 | 7/1972 | Zetterlund et al. | 104/172 BT |
| 3,797,406 | 3/1974 | Blessener | 104/172 BT |

Primary Examiner—Stanley H. Tollberg
Assistant Examiner—Hadd Lane
Attorney, Agent, or Firm—Bacon & Thomas

[57] ABSTRACT

A coupling and braking device for rail supported tow cars driven by means of an underfloor chain, each car having a movable, spring loaded front fender which, upon engagement against a protruding latching device of a stop barrier or of a standing preceding car, executes an energy absorbing motion with a motion component oriented at an angle to the travel direction, making it possible to block the release of the stored energy by means of the latching device. The latter is operatively connected to the movable front fender, moving rearwardly into a protruding activated position, when the fender is deflected. The blockable motion component may be oriented horizontally transversely to the travel direction, a split fender with laterally and rearwardly pivotable fender sections cooperating with a central wedge-like latch plate; or the blockable motion component may be vertical, in which case the fender sections move rearwardly and upwardly, being blocked against a downward release motion by a rearwardly extending latching frame of the preceding car.

19 Claims, 6 Drawing Figures

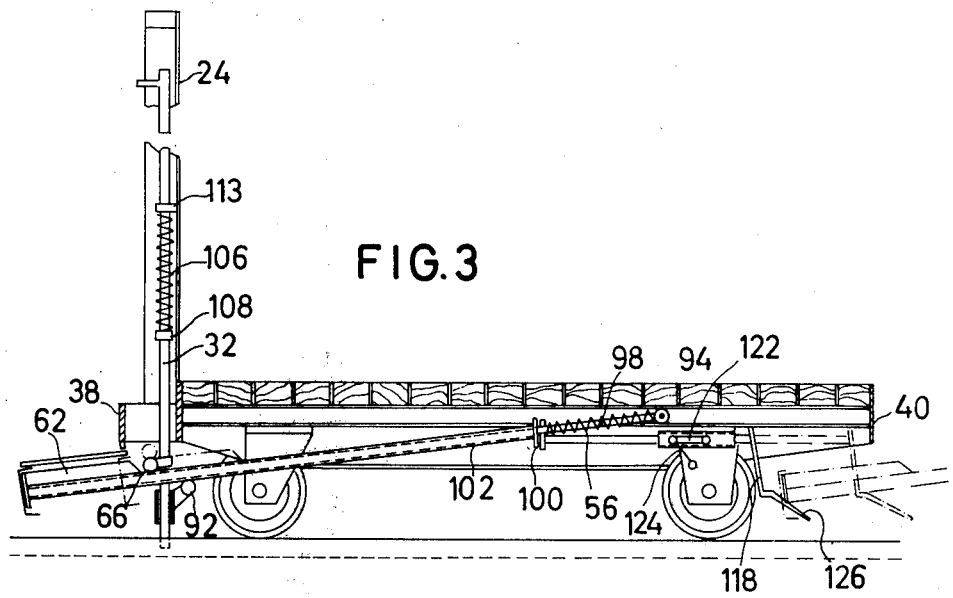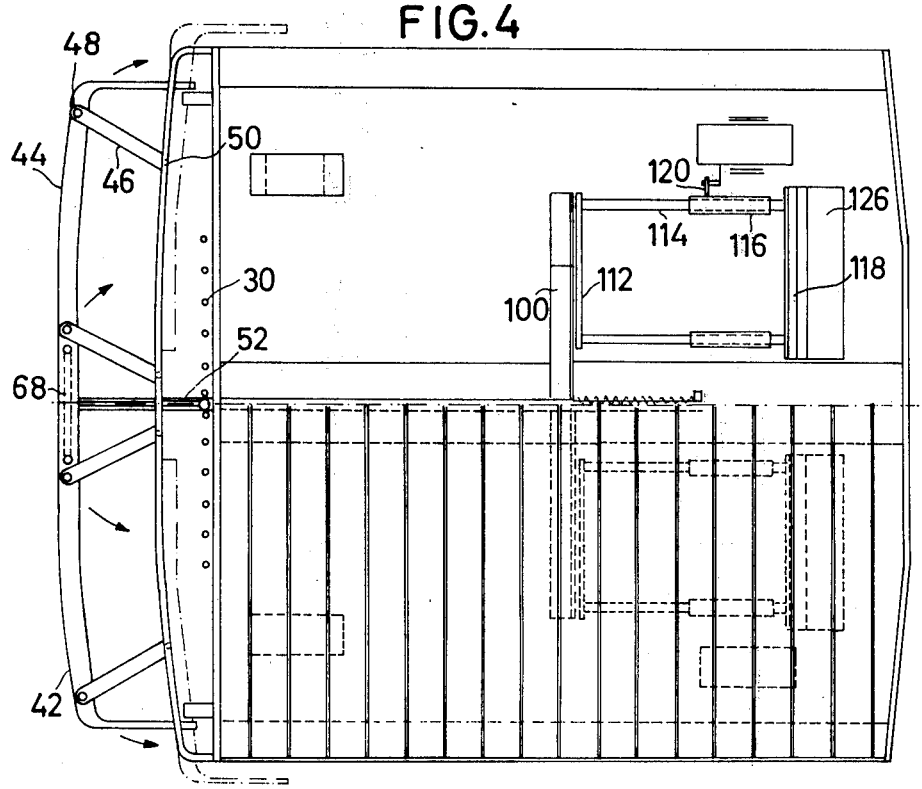

COUPLING AND BRAKING DEVICE FOR TOW PIN DRIVEN FLOOR TRUCKS

BACKGROUND OF THE INVENTION

1. Field of the Invention

The invention relates to coupling and braking device for rail supported transportation equipment, particularly tow cars.

2. Description of the Prior Art

U.S. Pat. No. 3,636,884 suggests tow cars which are guided along a floor groove by means of drive rods arranged at their front end and which are entrained by an underfloor tow chain, each car having rigid front and rear fenders and a substantially horizontally guided movable front fender. In its rest position, the movable fender extends forwardly beyond the rigid front fender. When a tow car runs up against a stationary stop barrier or against a standing tow car, its drive rod is disengaged from the drive chain. A latching device for the movable fender of the succeeding car is at the same time displaced from its forward rest position into a rearward activated position.

This known design has the shortcoming of having a comparatively strong dependency on manufacturing tolerances, due to the requirement that the backlash brake be actuated at the same instant at which the drive rod is disengaged. In order to ascertain that the drive rod is safely disengaged upon runup of the tow car and, for this purpose, to assure that the linkage mechanism of the movable fender is displaced far enough, it is necessary that the kinematic energy of the tow car be of sufficient magnitude. It follows from this that the tow cars will impact against each other substantially without prior deceleration, meaning that elevated forces are generated between cars, which are incompatible with tow cars loaded with piece goods.

A further disadvantage relates to the fact that, immediately upon impact, an initial reverse movement of the car takes place, until the backlash brake takes full effect. Because of the tight tolerances involved, it may happen at this moment that the drive rod is again engaged with the drive chain, which may have destructive consequences.

SUMMARY OF THE INVENTION

It is an objective of the present invention to suggest an improved coupling and braking device of the above-mentioned type by means of which tow cars can be stopped without impact against a stop barrier or when running up against a standing car, elevated deceleration forces, which tend to damage piece goods and to create noise problems, being eliminated in a spring-dampened stopping action, without thereby creating the attendent undesirable "pumping" phenomenon in a lineup of tow cars, when the cars first absorb the impact energy and, releasing it, push each other back and forth.

According to the present invention, the above objective is attained by providing, as part of the mechanical connection between the movable front fender and the latching device, a spring loaded resetting means, whereby the latching device on the rear of the car is so arranged that, when it is in the active position, it is locked against the movable front fender of the succeeding car, as a result of a force component derived from the resetting force on the movable fender which is directed at an angle to the direction of car travel.

This feature of the invention takes into account the necessities of practical use which include, among other things, the fact that tow cars of such systems cannot be instantaneously stopped, because of their inherent inertia, coupled with the desire of minimizing the stresses on the cars, which are considerable in any case, while transporting the goods safely and smoothly. An additional benefit relates to a more tolerable lower noise level at the work place and the possibility of increasing the speed of the tow cars within the system.

Still another advantage resides in the fact that the tow car, while it is being braked, is not prevented from coasting a sufficiently long distance, in order to decelerate it at least partially through its own friction, an important role being also played by the friction between the fender and the latching device, which adds itself to the rolling friction on the running wheels of the car. According to the invention, this is accomplished by taking advantage of as long as possible an activating motion of the movable front fender, from the moment of disengagement of the drive rod from the drive chain to the end of movement of the movable fender, so that the deceleration energy is transformed in a smooth manner, being partially eliminated and partially stored, with the result that undesirable impacts and related noise developments as well as the pumping in a car lineup are effectively eliminated.

It is furthermore a characteristic feature of the present invention that at least a major portion of the deceleration energy of the car can be stored, while the undesirable fore and aft movements of each car within a car column are nevertheless prevented, by blocking the action of a force component of the stored resetting energy in the fender or in a connected mechanism, which force component is oriented at an angle to the direction of travel, so that it will not exert a movement force in that direction. The stored energy is only released, when the latching device at the stop barrier is removed, or when the cars are disengaged one by one.

BRIEF DESCRIPTION OF THE DRAWINGS

In the following, the invention is described in more detail with reference to several embodiments which are illustrated in the drawings, where

FIG. 3 shows an elevational view similar to that of FIG. 1 of a tow car in accordance with a second embodiment of the invention;

FIG. 4 is a schematic plan view of the tow car of FIG. 3;

DESCRIPTION OF THE PREFERRED EMBODIMENTS

Figure 1:
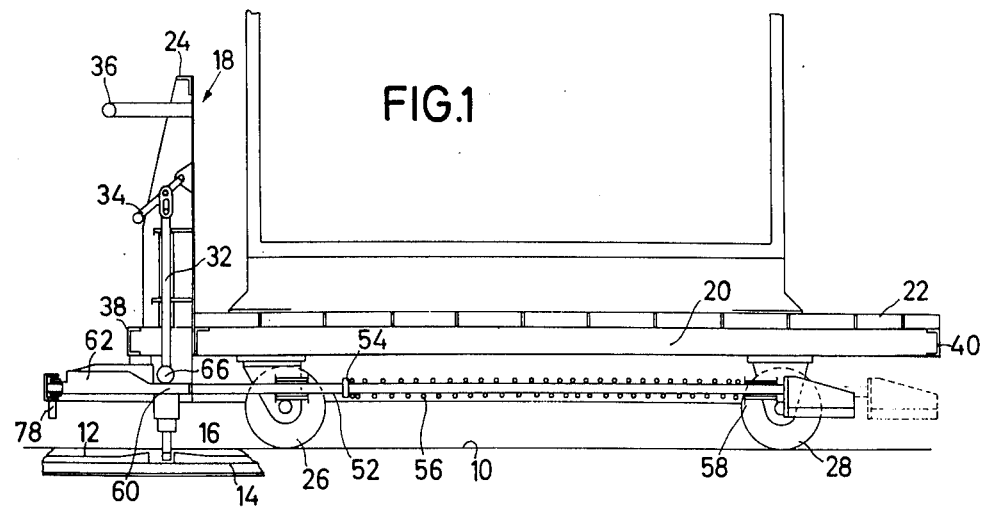
FIG. 1 shows a schematic, partically cross-sectioned elevational view of a tow car in accordance with a first embodiment of the invention.
Figure 2:
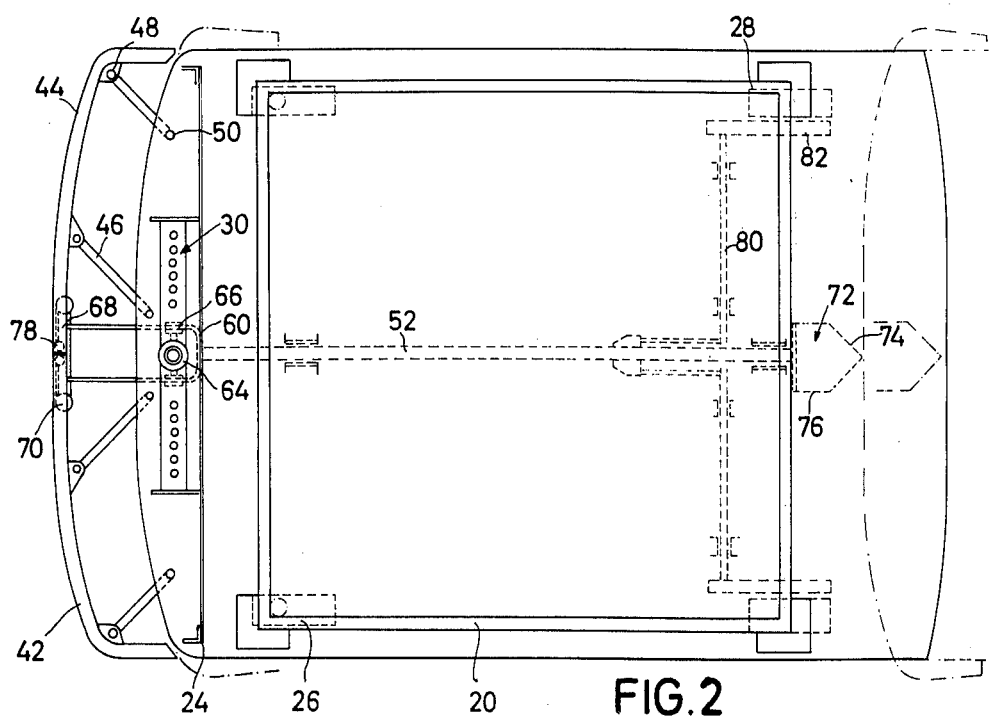
FIG. 2 is a plan view of the tow car of FIG. 1.

Referring to FIGS. 1 and 2, there is illustrated a tow car system including a typical tow car as part of such a system. The tow car system comprises a support plane 10 and a floor groove 12, including extension grooves, not shown, which branch away from the floor groove 12. Within the floor groove 12 is guided, inside a suitable guide profile, a driven underfloor tow chain 14 carrying drive members 16 to which a series of tow cars 18, like the one illustrated in FIG. 1, can be selectively coupled.

The tow cars 18 includes a car frame 20 supporting a horizontal loading platform 22 and a generally vertically extending head frame 24 at the forward end of platform 22. This platform is supported at a distance above the floor by means of two steerable front wheels 26 and two rear wheels 28. As part of the tow car system, each car 18 further includes in its forward portion (FIG. 2) a tranversely extending destination control unit 30, consisting essentially of a hollow horizontal profile having a series of vertical throughbores therein, into which trigger rods (not shown) for the selection of the destination point of the tow car can be inserted, cooperating abutments, cams, and electrical switches being arranged at the branching points and/or destination points at the level of the support plane 10.

In the forward portion of the tow car 18, either ahead or within the head frame 24, is arranged a vertically extending drive rod 32 which is engaged by a lever 34 by means of which the rod 32 can be either lifted and secured in a disengaged position, or lowered into the floor groove 12 for engagement with the drive member 16 of the tow chain 14. As FIG. 1 indicates, a handle bar 36 may be arranged above the lever 34 and attached to the head frame 24, in order to manually move the tow car 18 within the tow car system, before or after loading of the car.

Each tow car 18 further includes a rigid front fender 38 and a rigid rear fender 40, both fenders forming integral parts of the car frame 20. As can be seen in FIG. 2, the front and rear fenders are preferably slightly curved. Under normal operating conditions, for instance within a coasting stretch of the system, the fenders 38 and 40 serve to directly contact a preceding or succeeding car, depending upon which of the cars is still, or not yet, being driven by the underfloor tow chain 14.

In the embodiment of FIGS. 1 and 2, the tow car 18 further includes a movable front fender which is centrally split apart and thus consists of two fender sections 42 and 44. This fender is made of a suitable metal profile section the plan view contour of which corresponds substantially to the front contour of the tow car 18. Each of the two fender sections 42 and 44 is connected to the tow car frame by means of a pair of pivot links 46, one pivot 48 being in each case arranged at the fender section, and the other pivot 50 being arranged at the car frame 20. The length of the pivot links 46 and their orientation are so arranged that the movable fender sections 42 and 44, when pivoted laterally and to the rear in their activated position, come to approximately underly the front end of the car frame 20, protruding only laterally a small distance from the frame contour.

Behind the movable fender 42, 44 is arranged an activating or connecting rod 52 which extends generally horizontally underneath the car frame 20. On this rod is arranged a collar 54 against which is supported one extremity of a return spring 56 whose opposite extremity bears against a transverse frame member 58 of the car frame 20. On its forward end, the connecting rod 52 carries a U-shaped frame member 60, visible in FIG. 2, for example, the frame member forming release cams 62 on its upper contour, as shown in FIG. 1. A rearward motion of the frame member 60 thus causes the vertical drive rod 32 to be lifted out of engagement with the underfloor drive chain 14. For this purpose, the drive rod 32 is connected, in a known manner, with a hub 64 (FIG. 2) carrying on opposite sides cam followers 66 which rotate about a horizontal axis and engage the release cam 62. On the forward end of the U-shaped member is further arranged an end member 68, the lateral extremities of which carry vertically journalled rollers 70 engaging the rear side of the fender sections 42 and 44. The rollers 70 are laterally spaced in such a way that they engage the fender section 42 and 44 at all times, even when the latter are in their fully opened and rearwardly pivoted position.

The connecting rod 52, guided longitudinally in the center plane of the tow car 18, carries on its rear end a latch plate 72. The latter, as seen in the plan view of FIG. 4, has a pointed tapered portion 74 and a parallel portion 76 of suitable length, the upper side of which tapers rearwardly, as seen in FIG. 1.

In operation, a tow car system may, for example, include an intended buffer section, including a stop barrier with a latch plate similar to plate 72 which is movable into the path of the tow cars, so that the first tow car runs up against this stop position. The latch plate 72 thereby engages the movable fender 42, 44, opening it in wedging action and pivoting it rearwardly in relation to the arriving tow car. For this purpose, the fender sections 42 and 44 may be equipped with downwardly extending abutment fingers 78, mounted directly at the separation line and engaging the tapered portion 74 of the latch plate 72, thereby separating the fender sections 42 and 44. The lateral and rearward pivoting motion of the fender sections, through the intermediate of the rollers 70, pushes the U-shaped frame member 60 and the attached connecting rod 52 rearwardly, into an activated position which is indicated in FIGS. 1 and 2 by broken lines.

The rearwardly activated latch plate 72 now in turn serves as an activating device with respect to the next-following tow car which is still being driven by the underfloor drive chain 14, preventing a direct impact between the rigid front fender 38 of the arriving tow car and the rigid rear fender 40 of the standing tow car, by engaging the forwardly protruding movable fender 42, 44 of the arriving tow car. The activated latch plate 72, by pivoting the fender sections 42 and 44 of the moving car and by consequently displacing its connecting rod 52, disengages its drive rod 32 by means of its release cam 62. The remaining comparatively long displacement distances of the fender sections 42 and 44 and of the connecting rod 52 allow for a correspondingly ample braking time, during which, under certain circumstances, the rolling resistance of the tow car alone results in a sufficient deceleration of the latter, in order to prevent the undesirable unbraked impact stop that would otherwise take place. The activating movement of the connecting rod 52 causes the return spring 56 to be compressed, thereby likewise removing a certain amount of kinetic energy, which energy is being stored. The reverse discharge of this stored energy in the opposite travel direction is prevented, however, due to the provision that, following the braking of the car, the stored force of the spring 56, reacting against the fender sections 42 and 44, causes the latter to engage the parallel side walls 76 of the latch plane 72 from opposite sides. The length of these side walls 76, indicated only schematically in the drawing, should be such that it permits a certain longitudinal shifting during the braking maneuver of succeeding tow cars, while maintaining the latching engagement.

If necessary, the connecting rod 52 may be mechanically connected to a control shaft 80, as seen in FIG. 2, which, by means of suitable drive connections actuates brakes 82 for the rear wheels 28. As indicated further above, brakes of this kind are not absolutely necessary, except where the tow car system is so designed and built that it has very low rolling resistances.

A second embodiment of the invention will be described in the following with reference to FIGS. 3 and 4, component parts of this system which correspond to those of the preceding embodiment being designated with identical reference numerals. Here, too, the tow car 18 includes a car frame 20, a loading platform 22, front wheels 26, and rear wheels 28, a destination control unit 30 being again arranged in front of or within the head frame 24. The tow car has again a movable fender consisting of fender sections 42 and 44 which are pivotably connected to the car frame 20 by means of pivot links 46 and pivots 48 and 50 in such a way that the fender sections 42 and 44, when activated, occupy a displaced position as shown in FIG. 4 by broken lines.

As an alternative to the pivot links 46, either of the embodiments of FIG. 2 or FIG. 4 may have leaf springs arranged in their place, the latter being preferably fixedly mounted at the car frame 20 through clamping or welding, for example, while the front ends of the springs are connected to the fender sections 42 and 44 by means of pivots 48 as previously suggested. Advantages afforded by this modification include the elimination of some of the costly pivot connections and an improved ground clearance of the car. Another interesting feature of this arrangement relates to the possibility of adjusting the degree of energy storage through the selection of the leaf spring characteristics, the special return spring 56 being dispensable, so long as an engagement is provided between the fender and the front end member 68 connected to the connecting rod 52, as indicated in FIG. 4. Lastly, one may choose to combine both possibilities, using, for example, one leaf spring and one pivot link on each fender section.

Unlike in the first embodiment, the connecting rod 52 of the tow car of FIGS. 3 and 4 is slanted downwardly in the forward direction, being supported by a roller 92 mounted on the front portion of the car frame, while its rearward extremity is extendable in a telescopic fashion. The pivot axes 48 and 50 of the pivot links 46 are arranged approximately perpendicularly to the plane of inclination of the connecting rod 52, so that the fender sections 42 and 44, when executing their lateral and rearward pivoting motion, follow the upward motion component of the connecting rod 52.

The rear end portion of the connecting rod 52 is telescopically extendable, a telescoping rod 98 being attached at 94 to the car frame 20 and surrounded by a return spring 56 engaging the tubular front portion 102 of the connecting rod 52. The spring 56 is axially confined between a collar part 100 at the rear end of rod portion 102 and the attachment point 94 of the rod 98. It follows from the illustration in the drawing that, when the tow car runs up against an obstacle positioned in the path of the movable fender 42, 44, the connecting rod 52 is moved rearwardly by the fender sections in the indicated upwardly slanted direction, whereby, as in the earlier embodiment, a release cam 62 arranged on the coupling rod disengages the drive rod 32 in the initial portion of the activation movement, through the action of a cam follower 66. As shown in FIG. 3, this embodiment may further include an additional return spring 106 associated with the drive rod 32 and engaging a collar 108 of rod 32, and a fixed flange 110 attached to the head frame 24.

The collar part indicated in FIG. 3 at the rear end of rod portion 103 of the connecting rod 52 may be part of a comparatively large angle iron 100, the latter forming a connecting member for an activating frame 112 mounted and horizontally guided in the rear portion of the tow car 18. The activating frame 112 comprises two horizontal rods 114, guided inside guide sleeves 116 and carrying at their rear ends a latch plate 118. One of the two horizontal rods 114 has a lateral pin 120 reaching through a slot 122 of the guide sleeve 116 (FIG. 3) and operatively engaging a brake control lever 124 for the rear wheels 28 of the tow car. As shown in FIG. 4, two identical activating frames 112 may be arranged on opposite sides of the connecting rod 52. Under certain circumstances, a single activating frame may be adequate, which carries a correspondingly larger latch plate 118 at its rear end.

The activating mechanism of this embodiment is so arranged that, when the movable fender 42, 44 and the associated rearwardly arranged latch plate 118 are activated, the vertical motion component of the return force acting on the mechanism can be blocked. For this purpose, it suffices to simply place a block or any other support underneath the rearwardly and obliquely upwardly displaced movable fender sections 42 and 44. The rear portion of the activating frame 118 is therefore accordingly inclined, having a lower engagement ramp 126 and an upper flat latching portion.

Figure 5:
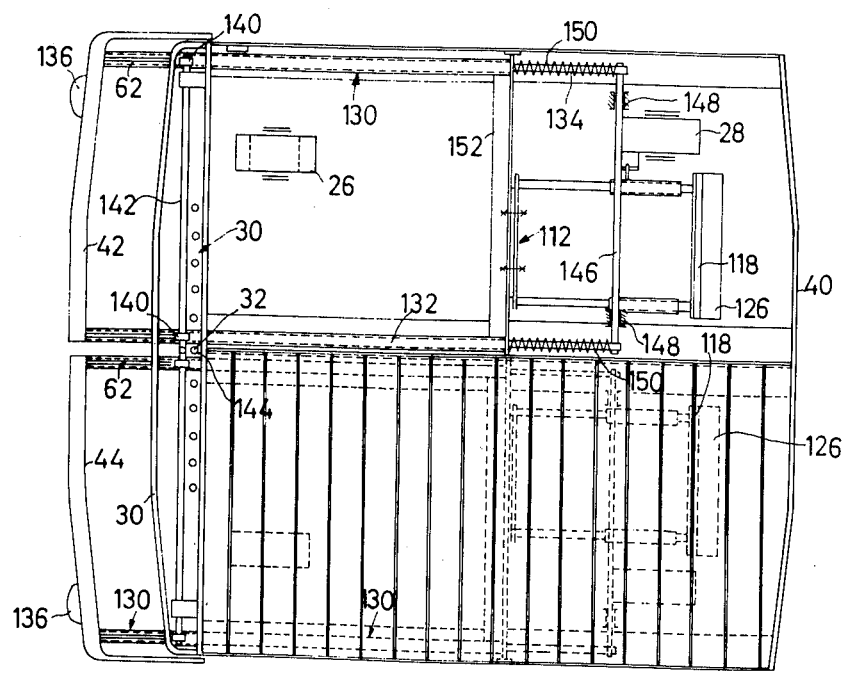
FIG. 5 is a plan view of a tow car in accordance with a third embodiment of the invention.

A further embodiment, illustrated in FIG. 5, corresponds to the embodiment of FIG. 4, to the extent that here, too, the principle of the forwardly downwardly inclined connecting rod is being employed. However, instead of having only one connecting rod 52, four such connecting rods 130 are used, each consisting of a forward tubular portion 132 and a rearward telescopically connected rod portion 134. A pair of connecting rods 130 is in each case rigidly attached to a section 42 or 44, respectively, of the movable front fender. These fender sections thus combine with the connecting rods 130 to form longitudinally movable frame units which, when the car runs up against a preceding car, are displaced obliquely upward. Rubber bumpers 136 may be arranged at the front side of the movable fender sections 42 and 44; it being of course also possible to provide such bumpers on any one of the other embodiments. Each one of the connecting rods 130 carries a release cam 62 engaging a suitable cam follower 140, all cam followers being arranged on a common shaft 142 which is operatively connected to the drive rod 32 by means of a connecting part 144.

The telescopic rod portions 134 at the rear of the connecting rods 130 are in each case attached to an anchoring rod 146, held fast in supports 148. Return springs 150 are again arranged between the anchored extremities of the rod portions 134 and the rear extremities of the tubular connecting rod portions 132. A pair of these rod portions 132 on each side of the car is transversely connected by means of an angle iron 152 to which is attached, as in FIG. 4, an activating frame 112. The latch plate of the activating frame and the brake control mechanism correspond likewise to the corresponding components described in connection with FIGS. 3 and 4.

Figure 6:
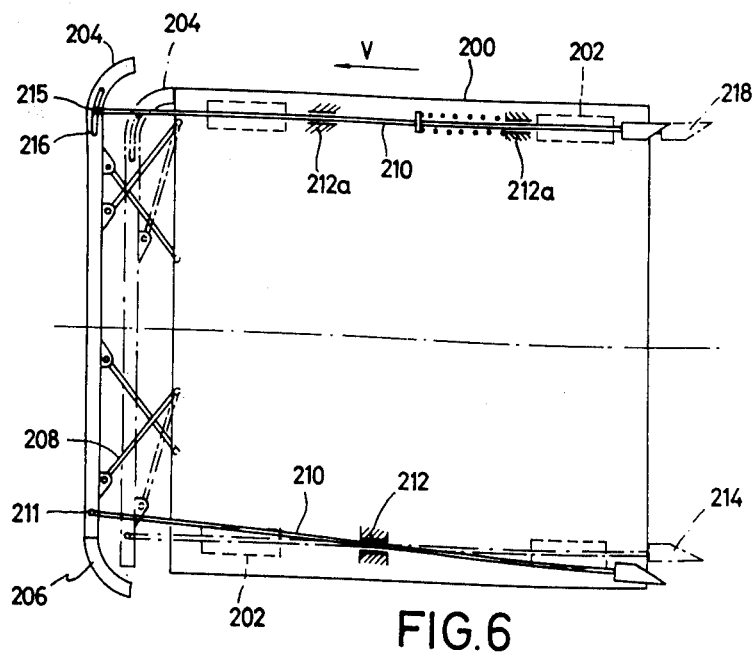
FIG. 6 is a schematic plan view of a fourth embodiment of the invention.

In FIG. 6 is schematically illustrated a car frame 200, supported on wheels 202, where two movable fenders 204 and 206 are arranged one above the other and mounted by means of parallel pivot links 208 similar to those described in connection with the embodiment of FIG. 2. Again, the pivot links 208, instead of, or in addition to having separate return springs, may themselves be spring members, in order to preload the fenders 204 and 206 into the forward position shown in the drawing. The upper fender 204 has a curved end portion on one side of the car, while the lower fender 206 has its curved portion on the opposite side of the car. If the tow car runs against an obstacle, its movable fenders 204 and 206 yield in a resilient manner, thereby dampening the impact. When this happens, the curved end portions of the tow fenders move rearwardly as well as laterally inwardly with respect to the longitudinal axis of the car, as shown in FIG. 6, such an activated position being indicated in the drawing by broken lines for the upper fender 204 only.

In order to obtain a blockable component of the spring return force oriented at an angle to the travel direction, in accordance with the basic principle of the present invention, suitable activating or latching means may be associated with these movable fenders. One possibility of such means is shown in FIG. 6, below the longitudinal center axis. It includes a connecting or activating rod 210, connected to the upper fender 204 at a pivot point 211 and guided with respect to the car frame 200 by means of a suitable guide sleeve 212. At the rear end of the activating rod 210 is arranged an activating wedge 214 which, when the fender 204 is in its rear, i.e activated position, protrudes from the rear extremity of the car, thereby engaging the movable fender of a subsequent car with its wedge 214, pivoting that fender inwardly and rearwardly, as described. The two oppositely arranged activating wedges 214 thus define a tapered mouth for the arriving tow car, simultaneously engaging its upper fender 204 and its lower fender 206 and pivoting the latter, thereby in turn activating its wedges 214.

A second possibility is illustrated in FIG. 6, above the longitudinal center axis, where the activating rod 210 is longitudinally guided for straight-line motion. For this purpose, the associated upper fender 204 has a slot 216 engaged by a pin 215 of the activating rod 210. The rearward and inward pivoting motion of the fender again displaces the activating rod 210 rearwardly, so that the activating wedge 218 is displaced to protrude rearwardly from the car in the activated position. If a similar operative connection is provided at the lower fender 206, it is possible to then transversely connect the two activating rods 210 to form a rigid frame. The disengagement of the drive rod, which is not shown in this embodiment, can be accomplished in a manner similar to that described in connection with FIG. 2 or FIG. 5. The return springs for the movable fenders may be arranged at any suitable place; they may, for example, also be torsion springs associated with the pivot connections.

We claim:

1. Coupling and braking device for rail supported transportation equipment, especially tow cars, which are guided along a floor groove by means of drive rods arranged at their front end and which are entrained by an underfloor tow chain, each car having rigid front and rear fenders and a substantially horizontally guided front fender movable with a movement component oriented at an angle to the travel direction, whereby the movable fender reaches forwardly beyond the rigid front fender and, when running up against a stop barrier or against a standing car, disengages the drive rod from the drive chain by means of a connecting mechanism moving against a return spring, while simultaneously displacing a latching device from a forward, passive position into a rearward activated operating position, the latching device being displaced into its activated operating position as a result of its attachment to the connecting mechanism, the device of the invention being characterized in that a spring loaded return means is provided as part of the mechanical connection between the forward movable fender (44) and the latching device (72; 118) and that the rearwardly arranged latching device (72; 118) is so arranged that, when it is in its activated operating position, it blocks the motion component, oriented at an angle to the travel direction, which results from the return force acting on the movable front fender (44) and connecting mechanism (52; 102) of the succeeding car which has run up against this car.

2. Device in accordance with claim 1, characterized in that the movable front fender is split in the center, consisting of two fender sections (42, 44), pivotably connected to the car frame (20) for the execution of a laterally and rearwardly directed pivoting motion, and that the latching device includes a rearwardly pointed tapered latch plate (72) guided along the longitudinal axis of the car, the latch plate (72) being of such width that it causes the fender sections to be displaced into their separated rearwardly pivoted end positions.

3. Device in accordance with claim 2, characterized in that the coupling mechanism consists of a connecting rod (52) which is guided horizontally underneath the car frame and carries at its rear extremity the latch plate (72), the connecting rod (52) including in its forward portion a frame member (60) having a release cam (62) for the drive rod (32) and engaging the rear side of the movable front fender sections with rollers (70).

4. Device in accordance with claim 3, characterized in that the rollers (70), arranged at the forward frame member (60) of the connecting rod (52), are laterally spaced such a distance that they remain engaged against the movable fender sections, even when the later are displaced into their laterally pivoted positions.

5. Device in accordance with claim 2, characterized in that the two sections (42, 44) of the movable front fender have upwardly or downwardly protruding fingers or rollers (78) for engagement against the wedge-shaped tapered latch plate (72).

6. Device in accordance with claim 3, characterized in that a helical spring (56) serves as a return means for the latch plate (72) and for the fender, the spring being supported against the car frame and against a collar (54) on the coupling rod, respectively.

7. Device in accordance with claim 2, characterized in that each of the movable fender sections (42, 44) is connected to the car frame by means of two pivot links (46), each link having one pivot point (50) at the car frame and one pivot point (48) at the fender.

8. Device in accordance with claim 2, characterized in that each of the movable fender sections (42, 44) is connected to the car frame by means of at least two leaf springs having a horizontal movement plane, the springs being so connected that one end thereof is attached rigidly and the other end is attached pivotably.

9. Device in accordance with claim 1, characterized in that the movable front fender is connected to a connecting rod arranged underneath the car frame and inclined forwardly downwardly, the connecting rod having connected thereto, in the area of the rear end of the car, a horizontally guided frame (112) carrying a latch plate (118) arranged to serve as a ramp for the movable front fender of a succeeding car, and capable of blocking the vertical motion component resulting from the return force acting on the fender and on the connecting rod of that succeeding car.

10. Device in accordance with claim 9, characterized in that the forwardly downwardly inclined connecting rod (52) is supported near the front end of the car frame by means of a roller (92) and its rear end portion is telescopically attached to the car frame (20).

11. Device in accordance with claim 9, characterized in that the movable front fender is split in the middle and that its sections (42, 44) are pivotable laterally and rearwardly be mans of pivot links or leaf springs, and that a frame end member (68) is connected to the forwardly downwardly inclined connecting rod (52).

12. Device in accordance with claim 9, characterized in that the movable front fender is split in the middle and consists of two fender sections (42, 44), each of which being connected to a frame (112) guided at the rear end of the car by means of two rigidly connected connecting rods (130) arranged on the side and in the middle of the car and guided along a forwardly downwardly inclined plane, the frame (112) carrying a latch plate (118) arranged to block the vertical motion component of the movable fender of a succeeding car.

13. Device in accordance with claim 1, characterized in that either the connecting rod, in its rear end portion, or a frame (112) connected thereto, includes means (82; 120) for actuating car brakes (82).

14. Device in accordance with claim 12, characterized in that a spring (106) serves as a return means for each connecting rod, the spring engaging a collar (108) and the car frame, respectively.

15. A system in which the cars, lorries, or cabins are arranged in the manner of overhead trolley equipment, being guidedly suspended on rails and preferably driven by means of an entrainment drive, the coupling and braking device including a movable front fender, a connecting mechanism, and a rear latching device, including return means, in accordance with claim 1.

16. Device in accordance with claim 3, characterized in that the two movable fenders (204, 206) are arranged one above the other and are laterally and rearwardly pivotable by means of pivot links or leaf springs (208) in such a way that the overall width of the two fenders in their pivoted position is smaller than in their extended position.

17. Device in accordance with claim 16, characterized in that the connecting rods (210) connected to the fenders include activating wedges (214; 218) at their rear extremities and are arranged alongside the car, so as to form an engagement mouth for the two superposed fenders of the succeeding car.

18. Device in accordance with claim 16, characterized in that the two connecting rods (210) connected to the rearwardly arranged activating wedges (214; 218) are guided at the car frame (200) for parallel motion and are connected to the front fender by means of a slot-and-pin connection (215, 216).

19. Device in accordance with claim 17, characterized in that each of the connecting rods (210) is pivotably connected to the associated fender (204, 206) in such a way that, when the fenders are pivoted rearwardly, the engagement mouth between the rearwardly extended wedges defines a reduced opening distance.

* * * * *